July 12, 1966   R. M. JOHNSON   3,260,334
OVERRIDEABLE BALL CLUTCH
Filed July 13, 1964
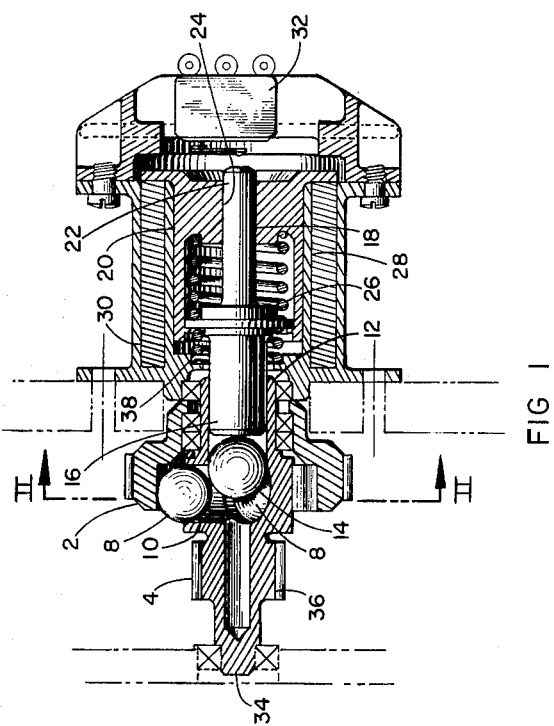
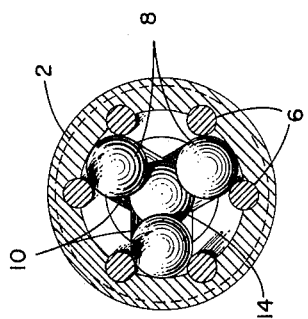
RICHARD M. JOHNSON
INVENTOR
BY Robert M. Sperry
ATTORNEY United States Patent Office 3,260,334
Patented July 12, 1966

3,260,334
OVERRIDEABLE BALL CLUTCH
Richard M. Johnson, Dallas, Tex., assignor to Ling-Temco-Vought, Inc., Dallas, Tex., a corporation of Delaware
Filed July 13, 1964, Ser. No. 382,043
3 Claims. (Cl. 192—56)

This invention relates to clutch mechanisms and is particularly directed to overrideable, electromechanical ball clutches.

Virtually all modern aircraft are equipped with automatic pilot systems which may be engaged to actuate and regulate the various control surfaces of the aircraft by means of servomechanisms. However, in any manned aircraft, the responsibility for proper control of the aircraft rests ultimately with the human pilot. Consequently, it is essential that means be provided which will permit the human pilot to assume manual control of the aircraft whenever he deems it necessary or desirable. Ordinarily, this can be accomplished in a more or less leisurely manner, so that the pilot will be able to disengage the automatic pilot prior to assuming manual control of the aircraft. However, situations may occur which demand that the pilot assume manual control instantaneously, without having time to disengage the automatic pilot. Therefore, it is desirable that the pilot be able to manually override the automatic pilot to assume control of the aircraft.

Numerous devices have been proposed heretofore for permitting manual override of automatic pilot systems. However, none of the prior art devices have been entirely satisfactory. When the pilot manually overrides the automatic pilot, he will be forced to continuously fight the restoring action of the automatic pilot, unless means are provided for to automatically disengage the automatic pilot in response to manual override. In spite of this, many of the prior art manual override devices do not provide for disengagement of the automatic pilot or provide only partial disengagement, with the result that the automatic pilot presents considerable "drag" to manual control of the aircraft. Other prior art manual override devices employ cam surfaces which must be carefully machined, thus, making the device relatively expensive.

These disadvantages of the prior art are overcome with the present invention and novel means are provided which completely disengage the automatic pilot, in response to manual override, so that no drag is presented to manual control of the aircraft.

The advantages of the present invention are preferably attained by providing a novel, overrideable, electromechanical ball clutch assembly coupling the respective servomechanisms with the appropriate control surfaces of the aircraft. The clutch assembly of the present invention comprises a driving member, a driven member, coupling means for releasably engaging said driving member and said driven member for simultaneous movement, resilient means for applying predetermined pressure to said coupling means to urge said coupling means to engage said driving member and said driven member, electromagnet means for releasably retaining said resilient means, and means responsive to pressure on said coupling means in excess of said predetermined pressure to deenergize said electromagnet means for releasing said resilient means to cause said coupling means to disengage said driven member from said driving member.

Accordingly, it is an object of the present invention to provide improved means for manual override of automatic pilot systems.

Another object of the present invention is to provide improved overrideable clutch means.

A further object of the present invention is to provide improved overrideable clutch means which will completely disengage in response to override.

A specific object of the present invention is to provide an improved clutch assembly comprising a driving member, a driven member, coupling means for releasably engaging said driving member and said driven member for simultaneous movement, resilient means for applying predetermined pressure to said coupling means to urge said coupling means to engage said driving member and said driven member, electromagnet means for releasably retaining said resilient means, and means responsive to pressure on said coupling means in excess of said predetermined pressure to deenergize said electromagnet means for releasing said resilient means to cause said coupling means to disengage said driven member from said driving member.

These and other objects and features of the present invention will be apparent from the following detailed description, taken with reference to the figure of the accompanying drawing.

In the drawing:

FIGURE 1 is a vertical section through a clutch assembly embodying the present invention; and FIGURE 2 is a transverse section taken on the line II—II of FIG. 1.

In the form of the present invention chosen for purposes of illustration, the drawing shows a clutch assembly having a driving gear 2 and a driven gear 4 which are releasably coupled for rotation by pins 6 and balls 8. The pins 6 are fixedly carried by gear 2, while balls 8 are contained by radial passageways 10 in gear 4. In the drive relationship, the balls 8 are biased outwardly and couple the gears 2 and 4 through engagement with pins 6.

As seen in FIG. 1, gear 4 is formed with a hollow shaft portion 12 which houses an additional ball member 14 and receives one end 16 of a piston 18. Piston 18 is moveably mounted in a cartridge 20 and has a projection 22 which extends through an opening 24 in one end of the cartridge 20. A spring 26 urges piston 18 to a position such that end 16 of piston 18 presses against ball member 14, causing ball 14 to force the balls 8 outward for driving engagement with pins 6. The tension of spring 26 determines the torque required to override the clutch. To complete the description of the clutch assembly, cartridge 20 is slideably mounted in a cylindrical member 28 and is normally retained in position magnetically by means of electromagnet 30. An electrical switch 32 for controlling electromagnet 30 is mounted on one end of cylindrical member 28 and is positioned for actuation by projection 22 of piston 18.

It will be apparent that gears 2 and 4 may be components of substantially any series gear train. Thus, the clutch assembly of the present invention is capable of a wide variety of applications. To provide a manual override for the automatic pilot of an aircraft, shaft portion 34 of gear 4 may be connected, by any suitable means, to actuate a control surface of the aircraft. Splined portion 36 of gear 4 may be connected, in any conventional manner, to rotate gear 4 in response to actuation of appropriate manual control mechanism by the human pilot of the aircraft. Thus, gear 4 provides direct mechanical linkage between the manual control mechanism and the control surface or system of the aircraft. The appropriate servomechanism of the automatic pilot system may be connected, by any suitable means, to rotate gear 2 of the clutch assembly.

Under normal conditions, with the automatic pilot system engaged, electromagnet 30 holds cartridge 20 in position and spring 26 places predetermined tension against piston 18, causing piston 18 to bear against ball member 14 and forcing balls 8 outward. Upon rotation of gear 2 by the servomechanism of the automatic pilot, balls 8 are engaged between pins 6 of gear 2 and the sides of passageways 10 in gear 4 to transmit driving force between gears 2 and 4. This force is passed through shaft portion 34 of gear 4 to couple the control surface linkage with the servomechanism of the automatic pilot.

To override the clutch, the human pilot moves the manual control mechanism in the cockpit of the aircraft and this motion is applied to splined portion 36 of gear 4. Since gear 4 provides direct linkage between the manual control mechanism and the appropriate control surface of the aircraft, as described above, the human pilot obtains control of the aircraft immediately. When the attitude of the aircraft departs from that dictated by the automatic pilot, the departure will be detected by the sensing apparatus of the automatic pilot system and a restoring torque will be applied by the servomechanism to gear 2. However, since the human pilot has assumed manual control of the aircraft, the torque applied by the automatic pilot system will exceed the predetermined value, established by spring 26, and gear 2 will rotate independently of gear 4. When this occurs, pins 6 of gear 2 will act to drive balls 8 radially inward along the passageways 10 forcing ball member 14 to move axially of the hollow shaft portion 12 of gear 4 and driving piston 18 against the action of spring 26. This movement of piston 18 causes projection 22 of piston 18 to actuate switch 32 which deenergizes electromagnet 30 to release cartridge 20. With cartridge 20 released, the tension is removd from spring 26. Consequently, piston 18 and ball member 14 will apply no pressure to balls 8. This allows balls 8 to move to their innermost positions in passageways 10 of gear 4, where the balls 8 are completely out of engagement by the pins 6 of gear 2. The gears 2 and 4 are, thus uncoupled and no torque will be transmitted therebetween. Thus, the automatic pilot cannot apply "drag" to control linkage to oppose the human pilot.

To reengage the clutch and, hence, recouple the automatic pilot to the control linkage, a holding relay, manual switch or other appropriate means, not shown, may be attracted to and held in the position shown in FIG. 1 and, thereby, places spring 26 under tension. As a result, spring 26 bears against piston 18 urging end 16 of piston 18 against ball member 14 and forcing balls 8 outward along the passageways 10 of gear 4 where the balls 8 may be engaged by the pins 6 of gear 2 to restore the driving relationship between gears 2 and 4.

If desired, a weak spring 38 may be provided to urge piston 18 rearward when electromagnet 30 is deenergized and, thus, assure complete uncoupling of the clutch. Preferably, spring 38 would have a tension which is negligibly small compared to those of electromagnet 30 or spring 28, so that the spring 38 will have no influence on the intended functioning of these components. In addition, numerous other variations and modifications may, obviously, be made without departing from the present invention. Accordingly, it should be clearly understood that the form of the invention described above and shown in the figures of the accompanying drawing is illustrative only and is not intended to limit the scope of the invention.

What is claimed is:

1. A clutch assembly comprising a driving member, a driven member, a plurality of balls and pins releasably coupling said driving member and said driven member for simultaneous movement, resilient means for applying predetermined pressure to said balls to urge said balls to engage said pins to transmit rotational motion between said driving member and said driven member, electromagnet means for releasably retaining said resilient means, and means responsive to pressure on said balls and pins in excess of said predetermined pressure to deenergize said electromagnet means for releasing said resilient means to cause said balls to disengage from said pins to uncouple said driven member from said driving member.

2. A clutch assembly comprising a driven member formed with a hollow shaft portion and a plurality of radially extending passageways communicating with said shaft portion, a driving member of generally annular configuration mounted for rotation on said shaft portion of said driven member, a plurality of pins fixedly mounted at spaced positions about said driving member and having portions of said pins projecting inward from the inner surface of said driving member, a plurality of balls carried within said passageways and moveable within said passageways between an outer position for engagement by said pins and an inner position where said balls cannot be engaged by said pins, a ball member moveable axially within said shaft portion of said driven member and engageable by said balls, piston means having a portion projecting into said shaft portion of said driven member for engagement with said ball member and having a projecting portion, resilient means for applying predetermined pressure to said piston to cause said piston to force said ball member to drive said balls to said outer position to couple said driven member with said driving member for simultaneous rotation, electromagnet means for releasably retaining said resilient means, and switch means engageable by said projecting portion of said piston upon movement of said piston in opposition to said resilient means for deenergizing said electromagnet means to release said resilient means to disengage said driven member from said driving member.

3. A clutch assembly comprising a first gear formed with a hollow shaft portion and a plurality of radially extending passageways communicating with said shaft portion, a second gear of generally annular configuration mounted for rotation on said shaft portion of said first gear, a plurality of pins fixedly mounted at spaced positions about said second gear and having portions of said pins projecting inward from the inner surface of said second gear, a plurality of balls carried within said passageways and moveable within said passageways between an outer position for engagement by said pins and an inner position where said balls cannot be engaged by said pins, a ball member moveable axially within said shaft portion of said first gear and engageable by said balls, piston means having a portion projecting into said shaft portion of said first gear for engagement with said ball member and having a projecting portion, resilient means for applying predetermined pressure to said piston to cause said piston to force said ball member to drive said balls to said outer position to couple said first gear with said second gear for simultaneous rotation, a cylinder, capsule means slideably mounted within said cylinder means for containing said resilient means, electromagnet means for releasably retaining said capsule means in a position to place said resilient means under tension, and switch means engageable by said projecting portion of said piston upon movement of said piston in opposition to the pressure from said resilient means for deenergizing said electromagnet means to release said capsule means and relieve the tension of said resilient means to disengage said first gear from said second gear.

References Cited by the Examiner

UNITED STATES PATENTS 3,091,316   5/1963   Huffman _____ 192—150

FOREIGN PATENTS 875,483   8/1961   Great Britain.

FRANK SUSKO, *Primary Examiner.*

DON A. WAITE, A. T. McKEON, *Assistant Examiners.*